Patented July 15, 1947

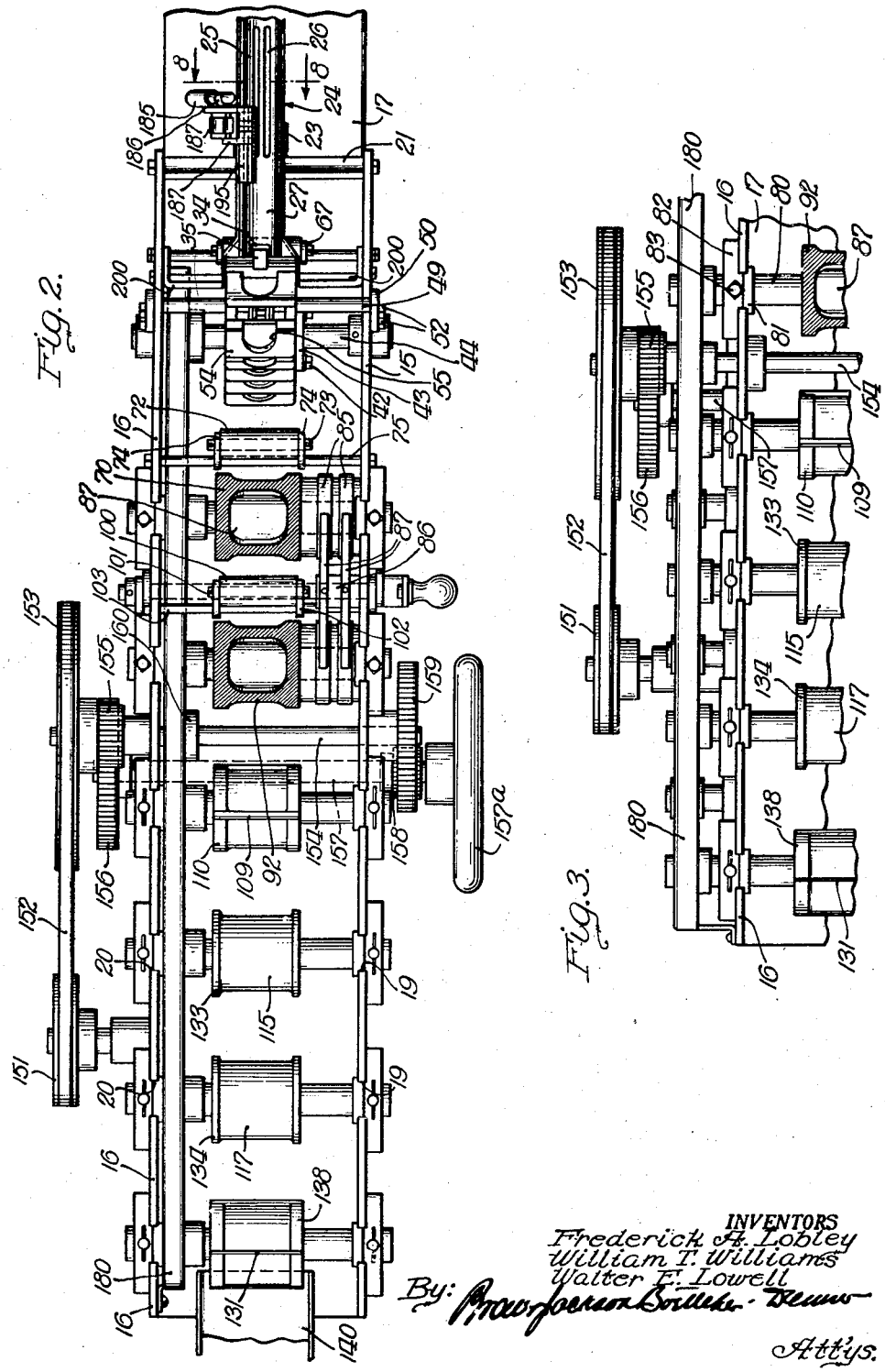

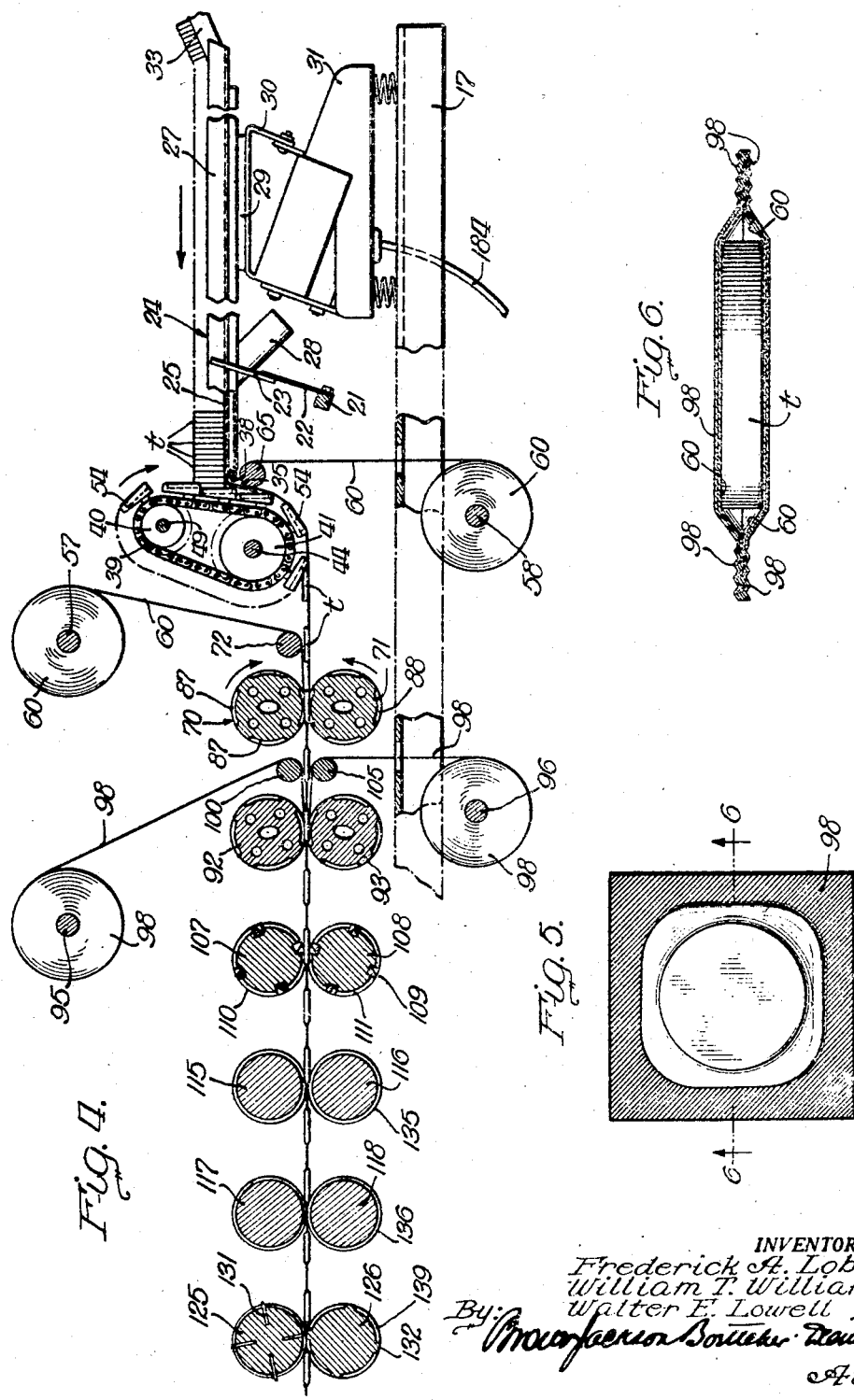

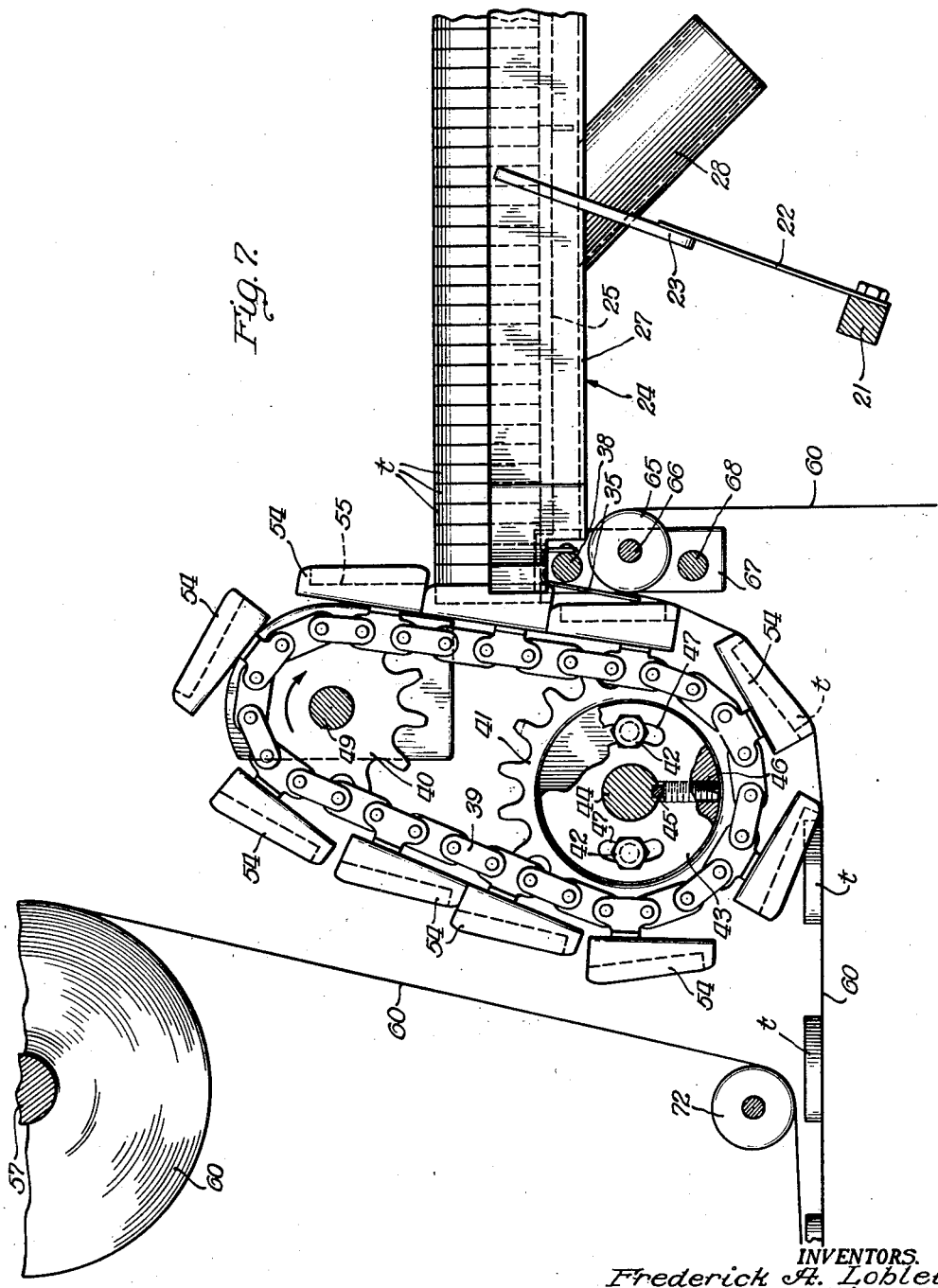

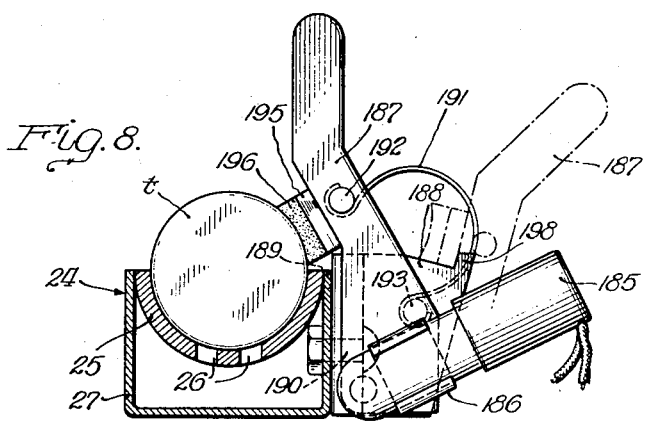
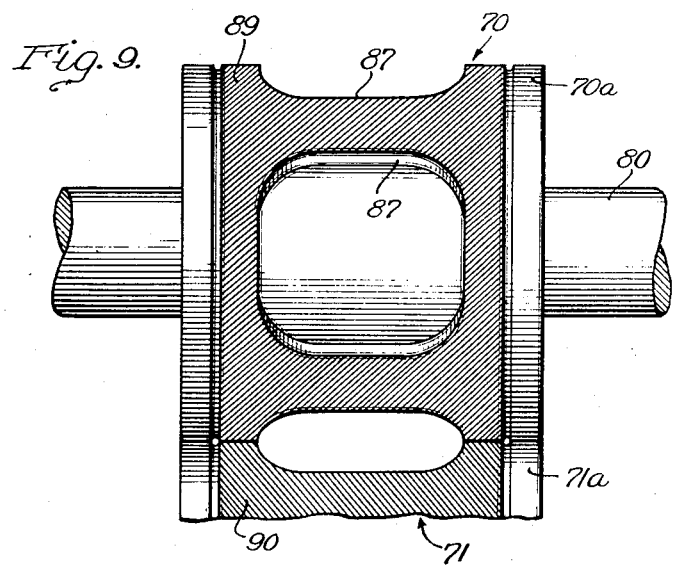
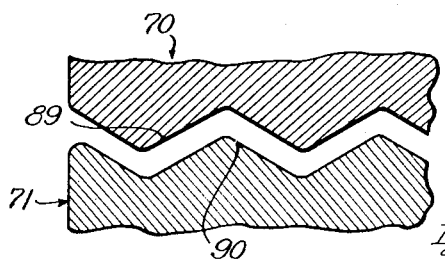

2,424,103

UNITED STATES PATENT OFFICE 2,424,103

CONVEYOR FOR PACKAGING MACHINES

Frederick A. Lobley, William T. Williams, and Walter E. Lowell, Elkhart, Ind., assignors to Miles Laboratories, Inc., Elkhart, Ind., a corporation of Indiana Application October 16, 1943, Serial No. 506,562

5 Claims. (Cl. 198—35)

This invention relates to the packaging of materials, and has to do more particularly with a packaging machine.

Packaging machines, in which the material, in tablet form, is sealed between two enclosing thermoplastic strips, by passage between heated corrugated sealing rolls, are known. In such machines the surfaces of the sealing rolls are milled to provide interfitting corrugations for crimping together the thermoplastic strips about the enclosed tablet. This milling of the sealing rolls must be accurate and requires considerable skill as well as being time consuming. Further, known machines with which we are familiar do not have feed means capable of delivering between the thermoplastic strips materials of fragile character, at high speed and with the requisite accuracy, without objectionably high breakage of the material, rendering such machines unsuitable for that purpose.

Our invention is directed to a packaging machine of comparatively simple construction and operation which avoids the above noted objections to the known packaging machines above referred to. More specifically we provide oppositely threaded sealing rolls, which may readily be produced at relatively low cost, and provide improved feed means capable of delivering the material to be packaged, in tablet form, between the thermoplastic strips with accuracy and at high speed, while being also capable of feeding fragile materials without breakage thereof, or with very low breakage well with limits necessary to render practicable machine packaging of such materials. More specifically, the feed mechanism of our invention is continuously operating and delivers the tablets in a continuous stream, being smooth and unbroken in operation, whereby liability of breakage due to stopping and starting of the feed mechanism is eliminated. Further objects and advantages of our invention will appear from the detail description.

In the drawings:

Figure 2 is a plan view of the machine of Figure 1, with the rolls of the enclosing strip materials and associated parts omitted for clearness of illustration;

Figure 3 is a fragmentary view on the same order as Figure 2, but showing a modification of the gear train for driving the sets of rolls;

Figure 4 is a diagrammatic lengthwise vertical sectional view of the machine of Figures 1 and 2, certain parts being shown in elevation and broken away;

Figure 5 is a plan view of a package produced by the machine of Figures 1, 2 and 4;

Figure 6 is a sectional view, on an enlarged scale, taken substantially on line 6—6 of Figure 5;

Figure 7 is a side view of the bucket feed mechanism and associated parts at the feed end of the machine, with the feed trough shown fragmentarily in elevation, certain parts being shown in section and certain other parts being broken away;

Figure 8 is a sectional view, on an enlarged scale, taken substantially on line 8—8 of Figure 2;

Figure 9 is a detail front view, on an enlarged scale, of the front pair of sealing rolls, with the major portion of the lower roll broken away; and Figure 10 is a fragmentary vertical sectional view, on a greatly enlarged scale, of the adjacent portions of the sealing rolls of Figure 9.

Figure 1:
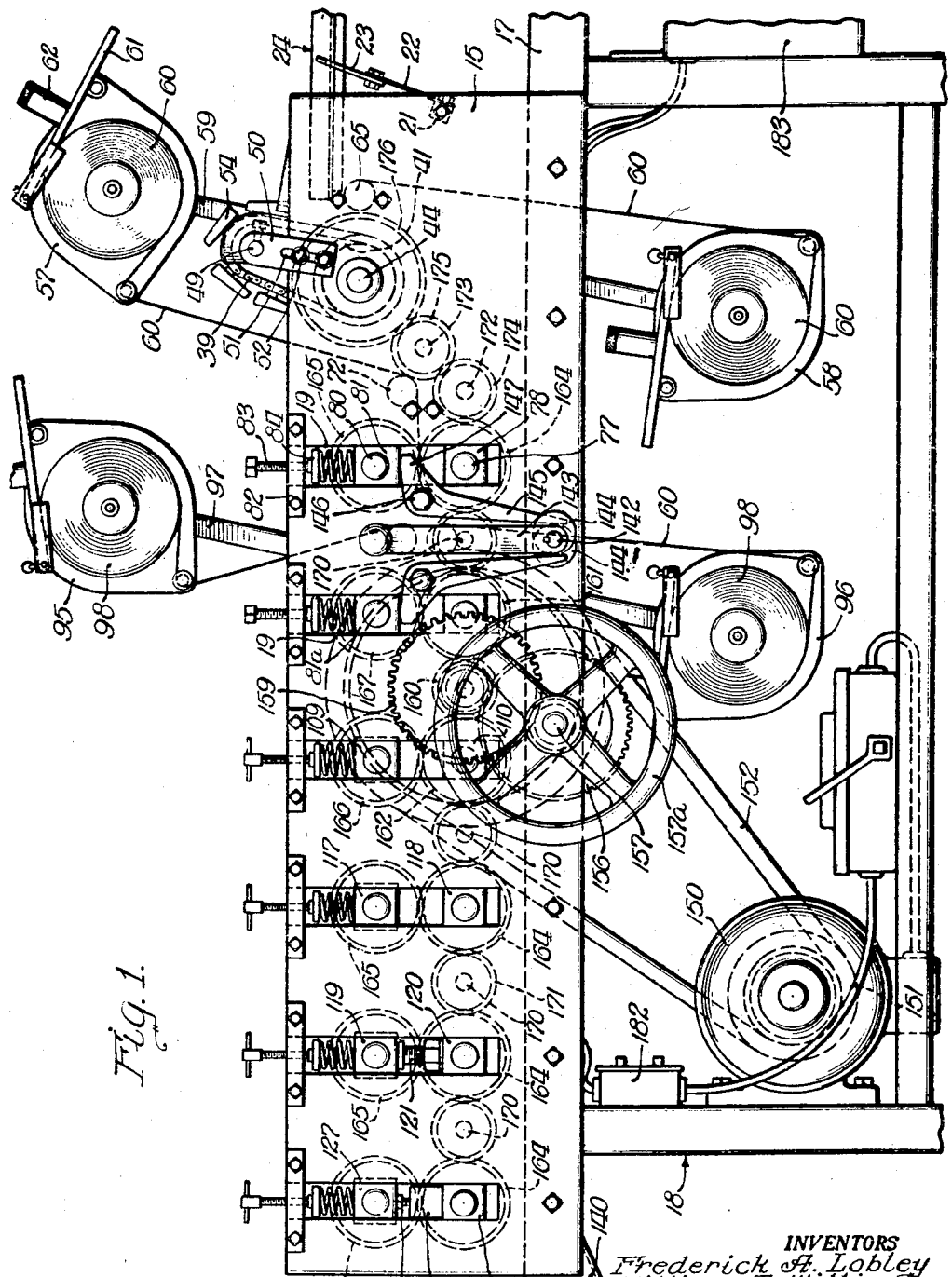
Figure 1 is a side view of a packaging machine embodying our invention, with parts broken away.

Referring to Figures 1 and 2, the machine has a suitably braced frame comprising side plates 15 and 16, of appreciable thickness, bolted to and extending upward from a base member 17, of channel cross-section, projecting forward beyond plates 15 and 16 and constituting the top member of a supporting stand 18, suitably reinforced. The frame may, within the broader aspects of our invention, be of any other suitable or preferred construction. Side plate 15 is provided with a plurality of vertical slots 19 extending from its upper edge, and plate 16 is provided with similar slots 20, the slots 19 and 20 being arranged in pairs with those of each pair aligned transversely of the machine.

A cross rod 21 of square cross section is secured between the side plates 15 and 16, conveniently by bolting, at the forward ends thereof. A leaf spring 22 is bolted at its lower end to rod 21 and extends upward and forward therefrom. At its upper end leaf spring 22 is secured, conveniently by bolting, to a plate 23 depending from and welded to a feed trough structure 24, adjacent the rearward end thereof. The structure 24 comprises a trough 25 of semi-circular cross-section provided with lengthwise slots 26, and a casing 27 of U-shape in cross-section (Figures 2 and 8) welded to and depending from trough 25, this casing being open at its rearward end (Figures 4 and 7). A tubular neck 28 opens at its upper end into casing 27, a short distance from the rearward end thereof, and extends downward and forward therefrom for connection by a flexible hose to a suitable source of suction (not shown), to remove dust. A plate or pad 29 is welded to casing 27 adjacent the forward end thereof and is secured to a depending bracket 30, of substantially inverted U-shape, the arms of which are bolted to a spring mounted electrical vibrator 31 supported on the forward extension of base member 17. The vibrator 31 is of known type, that shown being known as the "Syntron" vibrator, and is of a character to impart lengthwise vibration to the trough structure 24 in such manner that the articles to be packaged, such as disc-shaped tablets $t$, in the trough are advanced smoothly and continuously along the latter toward the rearward end thereof. The inner radius of trough 25 is the same as the radius of the tablets $t$ (Figure 8) which fit snugly within the trough and are advanced toward the rearward end thereof, in the manner stated. These tablets are formed by pressing the material, in powder form, into tablets, in a machine of known type, having a trough 33 which delivers the tablets to the trough 25 at the forward or receiving end thereof. In the travel of the tablets along trough 25, a certain amount of the powder from which the tablets are formed is released, this powder passing through the slots 26 in the lower portion of trough 25 into the casing 27, from which this powder or dust, and any fine particles of material, is removed by suction through the neck 28.

The rearward end of trough 25 is notched out at its lower portion, at 34 (Figure 2), for reception of the bight element of a leaf spring 35, shown more clearly in Figure 7, the forward arm of which is secured to a cross rod 38 extending between and bolted or otherwise suitably secured to the side plates 15 and 16 of the main frame. The rearward arm of spring 35 is of much greater length than the forward arm thereof and extends downward and rearward from trough 25. The rearward end portion of trough casing 27 is flared laterally and defines a passage for receiving buckets of a feed mechanism associated with the trough. There is slight clearance between the buckets and the flared end of the conveyor, effective for preventing transmission to the buckets of the vibration of the conveyor trough and for preventing objectionable accumulation of dust on the sides of the buckets. This feed mechanism comprises a sprocket chain 39 passing about an upper idler sprocket wheel 40 and a lower driven sprocket wheel 41. The latter sprocket wheel is secured, by cap screws 42, to a timing disc 43 mounted upon a cross shaft 44 rotatably mounted in the side plates of the main frame. Disc 43 is provided with a keyway which slidably receives a key element 45 of shaft 44, and is secured in adjustment on shaft 44 lengthwise thereof by a set screw 46. The cap screws 42 pass through arcuate slots 47 of considerable length in disc 43, so that by slightly loosening these screws the sprocket wheel 41 may be adjusted about shaft 44, from which it is free other than its connection to disc 43, and, by again tightening up cap screws 42, may be secured in adjusted position, for accurately timing the feeding mechanism, as will appear later. Any other suitable means may be provided for timing the feed mechanism, within the broader aspects of our invention. The upper sprocket wheel 40 is mounted upon and free from a cross shaft 49 secured at its ends in supporting brackets 50 each of which is slotted from its lower end, at 51, and is adjustably secured to a side plate of the main frame by two bolts 52 passing through the slot 51. By adjusting the brackets 50 the tension of the chain 39 may readily be adjusted, as will be clear, the two bolts 52 effectively holding the respective brackets 50 against turning movement. Other suitable means may be provided for adjusting shaft 49 and thereby adjusting the tension of the chain 39. The sprocket wheel 40 is free to turn on shaft 49 and for movement thereon lengthwise thereof, so that adjustment of sprocket wheel 41 lengthwise of shaft 44 effects similar adjustment of sprocket wheel 40 lengthwise of its shaft 49.

It will be noted from Figure 7 that a line passing through the axes of the shafts 49 and 44 is inclined downward and rearward relative to the trough 25, and that the forward run of chain 39 is similarly inclined, though to a slightly less extent. In the operation of the machine, the sprocket wheel 41 is driven in clockwise direction, as is the sprocket wheel 40, as indicated by the arrow in Figure 7. The chain 39 carries a plurality of buckets 54 shaped as shown in Figures 2 and 7. Each of these buckets is provided with a pocket or recess 55 in its outer face and opening through its leading side, the upper portion of this recess being of semi-circular shape and of the same radius as the tablets $t$, which recess 55 receives. As the tablets $t$ are fed along the vibrating trough 25 in the manner above described, the buckets 54 at the forward run of the sprocket chain 39 travel downward and rearward relative to the trough. The rearmost tablet in the trough passes along the bight portion of the leaf spring 35 and enters the recess 55 of a descending bucket 54, the wall of this bucket at the upper end of the recess 55 contacting the tablet as the latter passes off of the bight element of leaf spring 35 and beyond the rearward end of trough 25, as shown in Figure 7. As that bucket descends, together with the tablet, the latter contacts the rearward arm of spring 35 and is held thereby in recess 55 of the descending bucket. A succeeding bucket receives the next tablet discharged from the trough and moves it downward, as the bucket descends, in the same manner. In that manner the tablets are successively removed from the trough by the buckets 54 of the feed mechanism, the rate at which the tablets are thus removed corresponding to the rate at which the tablets are fed along the trough, it being noted in that respect that the buckets 54 at the forward run of chain 39 move rearward as they move downward, the inclination of the forward run of this chain being such that the rate of rearward travel of the buckets corresponds to the rate of rearward travel of the tablets. We thus provide continuous and smoothly operating mechanism of such character that tablets which are too fragile to be handled by known feed mechanisms with which we are familiar may safely be handled without objectionable breakage.

Upper and lower reels 57 and 58, respectively, are mounted on a support 59 suitably secured to side plate 16 of the main frame, reel 57 being disposed above the main frame and reel 58 being disposed below such frame. The reels are of known construction, and each supports a roll 60 of a thermal bonding material in strip form, such as regenerated cellulose (known commercially as "Cellophane" or "Pliofilm"), or the material of the rolls 60 may be provided with a coating of any suitable known thermal bonding substance. Each of the reels has pivoted thereon an arm 61 which carries an adjustable weight 62, this arm bearing upon the circumferential surface of roll 60 and providing a friction brake for retarding rotation of roll 60 and preventing overrunning thereof.

The strip of material 60 from the lower reel 58 passes upward through an opening in base member 17 (Figure 4) and over a guide roller 65 rotatably mounted upon a shaft 66 secured in the midportions of two supporting arms 67 secured upon cross-rod 38 and a cross-rod 68, disposed below the cross-rod 38, extending between and bolted or otherwise suitably secured to the side plates 15 and 16 of the main frame. From the roller 65, strip 60 passes downward and rearward generally concentrically with the sprocket wheel 41 of the feed mechanism (Figure 7), and thence rearward to a pair of sealing rolls comprising an upper roll 70 and a lower roll 71. The strip 60 from the upper reel 57 passes downward therefrom in rear of the feed mechanism, about a guide roller 72 rotatably mounted on a shaft 73 secured in the upper ends of supporting arms 74 secured at their lower ends upon a cross-rod 75 extending between and bolted or otherwise suitably secured to the side plates 15 and 16 of the machine frame. From the guide roller 72 the upper strip 60 passes rearward between the sealing rolls 70 and 71, these rolls gripping the two strips 60 and serving as feed means for pulling these strips from the rolls thereof supported by the reels 57 and 58. To that end, suitable means, to be later described, is provided for rotating the upper sealing roll 70 in clockwise direction and the lower sealing roll 71 in counterclockwise direction, as viewed in Figure 4. As the lower strip 60 passes rearward and downward from the guide roller 65, it is contacted by the buckets 54 of the feed mechanism, so that this portion of the strip is maintained under tension and the tablets $t$ contained by the buckets are pressed against the rearward face of the strip, the buckets then travelling therewith to a position below the shaft 44, as shown more clearly in Figure 7, after which the buckets are raised upwardly from the strip and travel upward with the rearward run of chain 39. In that manner the tablets $t$ are placed upon the upper run of the lower strip 60 in uniformly spaced relation, it being understood that the sprocket 41 is driven at such speed that the buckets 54, in passing about this sprocket, travel at the same speed as the lower strip 60. The tablets $t$ then continue to travel rearward with the lower strip 60 passing beneath the guide roller 72, and thence rearward beneath the upper strip 60, from which the two strips converge rearward to the sealing rollers 70 and 71 which, in addition to pulling the strips 60 from their reels, also act to seal together the strips 60 between the tablets $t$ so as to enclose each thereof in an individual package, as will be explained more fully later.

The lower sealing roll 71 is provided with a shaft 77 of reduced diameter rotatably mounted in bearing blocks 78 mounted in the lower portions of the first pair of slots 19—20 in the side plates 15 and 16. The bearing blocks are provided with lateral flanges which contact the inner faces of the side plates and restrain the blocks against outward movement, the portions of the shaft 77 which pass through the blocks 78 being of reduced diameter to provide shoulders on the shaft restraining the blocks against inward movement, as is known. In like manner, the upper sealing roll 70 is provided with a reduced shaft 80 rotatably mounted through sealing blocks 81 slidable in slots 19—20 above the blocks 78. The upper ends of slots 19—20 are bridged by blocks 82 bolted to the side plates of the frame and receiving adjusting screws 83 provided at their lower ends with cups 84 which receive the upper ends of compression springs 85 confined between the cups and between blocks 81. That provides means whereby the pressure with which the upper sealing roll 70 is held in contact with the lower sealing roll 71 may be adjusted to suit requirements.

The sealing rolls 70 and 71 are provided with suitable openings therein (Figure 4) for reception of electrical heating elements and a controlling thermostat, and each of such rolls has a slip ring structure 85 mounted on its shaft with suitable connections to the heating elements and the thermostat. A brush holder 86 is mounted on the inner face of side plate 15, adjacent the slip ring structures 85, and carries brushes in the form of leaf springs 87, which brushes are connected to a suitable source of electrical energy and contact the slip rings of the slip ring structures. Means of this type for electrically heating rolls and controlling the temperature thereof is known and need not be described in greater detail; suffice it to state that suitable means is provided for heating the sealing rolls 70 and 71 and maintaining them at desired temperature.

Each of the sealing rolls 70 and 71 is provided at each end thereof, with a smooth bearing area 70a and 71a, respectively, which travel upon each other in the rotation of these rolls when they are in their normal operative contacting position. Roll 70 is also provided, at its midportion, with a plurality (in this case four) of pockets or recesses 87, which are substantially square in outline, with rounded corners, and are somewhat larger than the tablets $t$, for receiving the latter and to provide within the package adequate space for crushing of the tablet, as will be explained more fully later. The roll 71 is provided with pockets or recesses 88 similar to recesses 87 and which, in the rotation of the rolls, are successively opposed to the recesses 87 of roll 70. The area of the body portion of roll 70, between the end bearing areas 70a thereof and not occupied by the recesses 87, is provided with a continuous helical thread 89, the corresponding areas of the lower roll 71 being provided with a similar thread 90 but oppositely related to thread 89; that is, one of the threads is right hand and the other is left hand. In the rotation of the rolls 70 and 71, the tablets $t$ enter the opposed pockets 87 and 88, and the areas of these rolls surrounding such pockets stretch the strip 60 over the tablets and crimp together the areas of the strips extending from a short distance outward beyond the tablets to the side edges of the strips as well as between the tablets. The helical threads 89 and 90 of the rolls 70 and 71 do not bottom, but are spaced a slight distance apart, as shown more clearly in Figure 10, to avoid actual cutting or perforating of the strips 60. The result is that the strips 60 are crimped together and tightly secured one to the other by self-bonding therebetween, due to the heating effect of the sealing rolls, thus providing a tightly sealed closure about each of the tablets.

In certain cases the tablets may be sealed in suitable metal foil only, for example aluminum foil. When that is desired, the rolls 60 of regenerated cellulose are replaced by rolls of metal foil, providing metal foil strips the inner or opposed surfaces of which are provided with a coating of a suitable known substance which is effective, under the influence of heat and pressure, for bonding the strips together. The tablets are fed onto the upper face of the lower metal foil strip and the strips then pass between the sealing rolls 70 and 71, so that the tablets are sealed between the metal foil strips in the same manner as described above with respect to sealing them between the regenerated cellulose strips.

A second pair of sealing rolls 92 and 93 is mounted adjacent and in rear of the front pair of sealing rolls 70 and 71. This second pair of sealing rolls is mounted in the second pair of slots 19—20 of the side plates of the frame, in the same manner as the first pair, being constructed and heated in the same manner as rolls 70 and 71, and need not be described in greater detail. When it is desired to seal the tablets between strips of regenerated cellulose only, or between strips of metal foil only, the pressure on roll 92 is released and it is held in raised position, in any suitable manner, rendering the second pair of sealing rolls ineffective. It is often desirable to seal the tablets in metal foil, in addition to sealing them between strips of regenerated cellulose or analogous material, to guard against entry of moisture. For that purpose we provide upper and lower reels 95 and 96, respectively, mounted on a second support 97 secured to side plate 16 of the main frame. These reels 95 and 96 are the same as the reels 57 and 58, and need not be described in greater detail. Each of them carries a roll 98 of metal foil in strip form. The strip of foil 98 from the upper reel 95 passes downward about a guide roller 100 rotatably mounted on a shaft 101 (Figure 2) secured in the upper ends of supporting arms 102 secured at their lower ends upon a cross-rod 103 extending between and bolted or otherwise suitably secured to the side plates 15 and 16 of the machine. From the guide roller 100 the foil strip 98 passes rearward between the sealing rolls 92 and 93. The foil strip 98 from the lower reel 96 passes upward about a guide roller 105, supported in the same manner as roller 100, and thence rearward between the sealing rolls 92 and 93, at the under face of the lower strip 60. The sealing rolls 92 and 93 stretch the foil over the tablets enclosed between the strips 60, and crimp the areas of the foil strips extending laterally beyond the tablets and between them, such areas of the foil strips being secured to the strips 60 by the bonding action of the latter under the influence of the heat of the rolls, or, if desired, the opposed surfaces of the foil strips 98 may be provided with a coating of a suitable known substance which is effective, when heated, for bonding them to the strips 60. After the tablets have been thus enclosed between the strips 60 and the strips of metal foil 98, they may be cut apart to provide individual packages, one of which is shown in Figures 5 and 6. It will be seen that in this package the tablet is enclosed between the inner strips 60, which may be of regenerated cellulose, and the outer strips 98 of metal foil, these strips being stretched about the tablets and converging outwardly thereof as shown, for which purpose the recesses in the sealing rolls are somewhat larger than the tablets, as will be clear, the areas of the strips 60 and 98 outward beyond the converging portions thereof being crimped and bonded together so as to provide an effective seal for the package.

When the tablets are sealed between regenerated cellulose strips only, or between metal foil strips only, the second pair of sealing rolls is rendered ineffective, as above explained, and feeding of the metal foil strips 98 between the latter rolls is omitted. The tablets will then be sealed between regenerated cellulose strips only, or between metal foil strips only, as the case may be. The strips are then cut between the tablets so as to be separated into individual packages similar to that shown in Figures 5 and 6, except that in the first case the metal foil covering 98 is omitted and in the second case the regenerated cellulose covering 60 is omitted.

It will be clear, from the above, that the machine of our invention is well suited for sealing tablets and analogous articles in package form in regenerated cellulose or analogous material only, in metal foil only, and in both regenerated cellulose and metal foil, as desired or as conditions may require.

It is desirable in certain cases—for example, when packaging coffee extract tablets—that the tablets be inclosed between strips of regenerated cellulose or like material and between strips of metal foil, and be thereafter crushed in order that the material of which the tablets were formed—in this case, coffee extract—will readily dissolve in water. With that in view, we provide breaking and crushing rolls, between the sealing rolls and the cut-off rolls for cutting apart the packaged, or packaged and crushed, tablets, as will b explained.

A pair of breaking rolls, comprising an upper roll 107 and a lower roll 108 (Figure 4), is rotatably mounted in bearing blocks 109 and 110, in the third pair of slots 19—20 in the frame side plates 15 and 16, in the same manner as the sealing rolls 70 and 71 are mounted. Each of the breaking rolls 107 and 108 has secured thereto, lengthwise thereof, four equally spaced breaking bars 109, equally spaced about the roll and of substantially V shape in cross-section for the major portion of their length. Each of the rolls 107 and 108 is provided, at each end thereof, with a bearing ring 110 and 111, respectively, which are in contact when the rolls are in operative relation to each other and space the rolls a definite distance apart. In the rotation of the rolls 107 and 108 the bars 109 are brought successively into opposition and first engage the packaged tablets passing therebetween at the central portion of the respective tablets, the two opposed bars then defining a rearwardly converging passage between them and acting to break the tablet and to move the rearward portion thereof toward the rear of the containing package so as to provide adequate room for subsequent crushing of the tablet. This manner of breaking the tablet preliminary to crushing thereof, and the advantages attained thereby are described more fully and claimed in the copending application of Frederick A. Lobley, for packaging means and method, filed October 16, 1943, Serial No. 506,563, and need not be described here in greater detail. Suffice it to state that the breaking rolls 107 and 108 act to break the tablets preliminary to crushing thereof.

A first pair of crushing rolls, comprising an upper roll 115 and a lower roll 116, is rotatably mounted in supporting blocks 117 and 118, disposed in the fourth pair of slots 19—20 in the frame side plates 15 and 16, in the same manner as the sealing rolls 70 and 71 are mounted. The rolls 115 and 116 do not have radial projections at their crushing surfaces, which are smooth throughout their length, and the bite area between these rolls is of less height than that of the respective tablets t. As the web of packaged tablets moves rearward between the rolls 115 and 116, the latter exert pressure upon the tablets throughout the full extent thereof, thereby crushing them. From the first pair of crushing rolls 115 and 116, the web of packaged tablets moves rearward between a second pair of similar crushing rolls 117 and 118 mounted for rotation in bearing blocks 119 and 120, respectively, disposed in the fifth pair of slots 19—20 in the side plates 15 and 16 of the frame. The rolls 117 and 118 are spaced apart a predetermined minimum distance by adjustable nut and bolt means 121 therebetween of known character, blocks 119 being urged downward toward blocks 120 by adjustable compression spring means in the same manner as blocks 81 of the upper roll 70 of the first set of sealing rolls are urged downward. The height or vertical extent of the bite area between the rolls 117 and 118 is appreciably less than that of the bite area between rolls 115 and 116, so that rolls 117 and 118 act to crush the contents of the respective packages to the desired degree of fineness, preferably reducing it to substantially powder form. That completes the operation of breaking and crushing of the contents of the packages so as to reduce the material from a tablet to a crushed and substantially powdered condition.

A pair of cutting rolls, comprising an upper knife roll 125 and a lower platen roll 126, is rotatably mounted in bearing blocks 127 and 128, respectively, in the last pair of slots 19—20 in the side plates 15 and 16 of the frame. The blocks 127 are urged downward toward blocks 128 by adjustable spring compression means, of the character previously described, and the rolls 125 and 126 are maintained a predetermined minimum distance apart by means interposed between the blocks 127 and 128, such means comprising a block 129 seating upon the upper face of each of the blocks 128, and nut and bolt means of known character disposed between block 129 and block 127. The roll 125 carries a plurality of—in this case, four—cutting blades 131 secured therein in a suitable known manner, these blades cooperating with four bars or ribs 132 extending lengthwise of the platen roll 126. It will be noted (Figure 2) that the bearing areas or rails 110 at the ends of the breaking roll 107 are considerably wider than bearing rails 133 and 134 at the ends of the crushing rolls 115 and 117, it being understood that rolls 116 and 118 are also provided with bearing rails 135 and 136, respectively, at their ends corresponding in width to the bearing rails 133 and 134. The knife roll 125 is provided at each end thereof with a bearing area or rail 138, cooperating with similar bearing areas or rails 139 at the ends of the platen roll 126. The bearing rails 138 and 139 are of considerably greater width than the bearing rails of the crushing rolls 115 and 116, and 117 and 118. The bearing rails 110 and 111 of the breaking rolls 107 and 108 grip the lateral edge portions of the string or web of packages and serve to feed the web rearwardly to the two pairs of crushing rolls, the latter rolls in crushing the packaged material gripping the web frictionally and feeding it rearward. The bearing rails 138 and 139 of the cutoff rolls 125 and 126, respectively, also grip the lateral edge portions of the web and feed it rearward between these rolls. In that manner the web comprising the packaged material is maintained under proper tension and is fed rearwardly through the machine at comparatively high speed. The cut-off rolls 125 and 126 sever the web midway between adjacent packages, thus separating it into individual packages, which are discharged from the cutting rolls into a downwardly and rearwardly inclined trough 140, from which the severed packages may be delivered into a suitable container, onto a conveyor belt, or into an inclined conveyor chute, or otherwise suitably disposed of. The packages thus produced are similar to the packages shown in Figures 5 and 6, except that the material, instead of being in tablet form, has been crushed into substantially powder form, as above described. From what has been said, it will be seen that by the machine of our invention the materials may be packaged in tablet form, as above described, and, if desired, the tablets may be crushed to substantially powdered form when thus packaged. When it is not desired to crush the tablets, the upper breaker roll and the upper crushing rolls are held in raised position, rendering the breaking and the crushing rolls ineffective, as will be understood.

A hand wheel 157a is secured on shaft 157 and provides convenient means for manually operating the machine, at low speed, for making desired adjustments or other purposes. In order to facilitate threading of the strips of regenerated cellulose and, if used, the strips of metal foil, between the sealing rolls, it is desirable that means be provided whereby the upper sealing rolls may readily be moved upward into inoperative position. To that end a cross shaft 142 is rotatably mounted through the side plates 15 and 16 and base member 17 of the main frame. A crank 143 is keyed on one end of this shaft for imparting rotation thereto, and a pair of eccentrics is secured on shaft 142 adjacent the ends thereof. The eccentrics 144 are disposed between the lower ends of cam levers 145 of angle shape pivoted, adjacent their upper ends, by bolts 146, on the side plates 15 and 16 of the frame. Each of the levers 145 is provided at its upper end with a nose 147, this nose of one of the levers at each side of the frame engaging beneath bearing block 81, the nose of the other lever at each side of the frame engaging beneath bearing block 81a of the upper roll 92 of the second pair of sealing rolls. When the crank 143 is in its raised or upward position shown in Figure 1, the lower ends of the levers 145 contact the low areas of the eccentrics 144, and the upper ones of the sealing rolls are then held in their lowered positions in operative relation to the lower ones of such rolls. By turning the crank 143 into its upper position, through 180 degrees from its raised position, the high points of the eccentrics 144 are brought into position in contact with the lower ends of the levers 145, thus forcing the bearing blocks 81 and 81a upward in opposition to the compression springs, effective for holding the upper rolls of the pairs of sealing rolls in raised inoperative position, permitting ready insertion between the sealing rolls of the strips of regenerated cellulose or like material, and, if desired, the strips of metal foil. After that has been done, the upper ones of the sealing rolls are lowered into operative position, and the machine may then be set into operation for packaging the materials in the manner above described.

The machine is driven by an electric motor 150 suitably mounted on the frame 18. A V-pulley 151, secured on the shaft of motor 150, receives a V-belt 152 passing about a V-pulley 153, mounted for free rotation on a cross shaft 154 rotatably mounted through the side plates 15 and 16 of the frame. A spur pinion 155 is carried by pulley 153 for rotation therewith, this pinion 155 meshing with a gear 156 keyed on one end of a cross countershaft 157 rotatably mounted through the side plates 15 and 16 and base member 17 of the main frame. A pinion 158 is secured on shaft 157, adjacent the other end thereof, and meshes with a gear 159 keyed on the end of shaft 154 remote from the V-pulley 153. A pinion 160 (Figure 1) is keyed on shaft 154 adjacent the inner face of side plate 16 and meshes with gears 161 and 162, secured on the shafts of the lower sealing roll 93 and the lower breaking roll 108, respectively. Each of the lower rolls of the other set of rolls has a gear 164 secured upon its shaft and meshing with a gear 165 secured upon the shaft of the corresponding upper roll. In like manner, the upper breaking roll 107 has a gear 166 secured upon its shaft meshing with gear 162, and the upper roll 92 of the second set of sealing rolls has a gear 167 secured on its shaft and meshing with gear 161. Stub shafts 170 are welded or otherwise secured to side plate 16 of the frame, midway between the gears 164, between gear 162 and the next adjacent gear 164, and between gear 151 and the forward gear 164. Each of these stub shafts 170 has a pinion 171 rotatably mounted thereon and meshing with the two adjacent gears secured on the lower rolls of the machine. Two stub shafts 172 and 173 are secured to side plate 16 of the frame, in advance of the forward gear 164, these stub shafts having rotatably mounted thereon meshing pinions 174 and 175, respectively, pinion 174 meshing with the forward gear 164 and pinion 175 meshing with a gear 176 keyed upon shaft 44 of the feed mechanism.

The drive through the shafts 154 and 157 and the gearing associated therewith provides a speed reduction means for driving the machine at proper speed from the motor 150. When the machine is in operation the rolls of the various sets are driven in proper directions and at the same speed, and the feed mechanism also is driven in proper direction and at proper speed to remove the tablets from the trough at the same rate at which they are fed therealong by the action of the vibrator, as previously explained, the ratio of the gears driving the feed mechanism being properly selected to that end.

The gearing above referred to preferably is enclosed within a sheet metal housing 180 comprising a lower section, suitably mounted on the side plate 16, and a removable upper section. In Figure 3 the gearing is disposed exterior of the frame and is enclosed within a housing 180, as before, which is advantageous as providing more space between the side plates 15 and 16, permitting the use of wider rolls, when desired or as conditions may require.

A switch block 182 is mounted on stand 18 and carries switches for controlling the motor circuit and the circuit of the heating means previously referred to. Preferably, a main control switch (not shown) is also mounted on the stand 18. The supply of current to the vibrator 31 is regulated by a rheostat 183 of known type, conveniently mounted at the front of the stand and connected to the vibrator by a cable 184 (Figure 4). The vibrator circuit is controlled by a mercury switch 185 (Figures 2 and 8) carried by a clip 186 secured to one arm of a lever 187 of generally U-shape, straddling a U-shaped bracket 188 bolted to one side of casing 27 adjacent the rearward end of trough 25. Bracket 188 is provided with a stud 189 which projects into an opening in the side wall of casing 27 and cooperates with mounting bolt 190 for holding the bracket against turning movement. A bowed leaf spring 191 has one end hooked about a pin 192 extending between and secured in the arms of lever 187, and its other end hooked about a pin 193 extending between and secured in the arms of the bracket 188. This spring 191 acts as an over-center spring for holding the lever 187 in either its full line position shown in Figure 8, or in its dot and dash line position there indicated. In the full line position of lever 187 the mercury switch 185 is in its full line position, in which position the circuit of the vibrator is opened, thereby stopping vibration of the trough 25 and consequent travel therealong of the tablets t. In the dot and dash line position of lever 187 the mercury switch 185 is in a lowered position closing the circuit of the vibrator.

A bar 195, of appreciable length, is secured, conveniently by welding, to the inner edges of the arms of lever 187 and extends therebeyond lengthwise of trough 25. This bar 195 has secured to its inner face a pad 196 of sponge rubber or other suitable soft material, the inner face of which is concave transversely on the same radius as that of the tablets t. In the raised position of the switch lever 187, which stops operation of the vibrator, as noted, the sponge rubber pad 196 is pressed firmly against the tablets t in the rearward portion of trough 25, thus holding these tablets firmly in the trough and thereby preventing discharge of the tablets therefrom. Upon movement of the lever 187 to its circuit closing position, indicated in dot and dash lines in Figure 8, the sponge rubber pad 196 is moved out of contact with the tablets t, thereby releasing them to be fed along the trough to the feed mechanism, as previously described. Movement of the lever 187 outward away from the trough is limited by contact of bar 195 with a stop finger 198 projecting upward from one arm of the bracket 188. As the tablets t are advanced rearwardly along the trough 25, and are discharged from the rearward end thereof, they are received by the buckets 54 of the feed mechanism, in the manner previously described, guided by angle guide brackets 200 secured to and projecting inward from the inner faces of the side plates 15 and 16, the inner ends of these brackets being disposed in proximity to the sides of the buckets 54 passing downward therebetween.

We have shown our invention, by way of example, as embodied in a machine adapted for packaging tablets in a single string or row extending lengthwise of the machine. By increasing the width of the machine and duplicating the feed means and the feed trough, the machine may be adapted for packaging any desired number, within limits, of strings or rows of tablets. That may readily be accomplished by increasing the width of the feed buckets 54 and providing each bucket with the desired number of tablet receiving recesses 55, providing a trough structure having a plurality of feed troughs, corresponding in number to the recesses of the respective buckets, and increasing the length of the rolls and providing each of the sealing rolls with a plurality of recesses 87, corresponding in number to the recesses in the respective feed buckets. Alternatively, a plurality of feed mechanisms may be provided, instead of a single feed mechanism of increased width. Briefly, by increasing the width of the machine and providing a suitable number of troughs and corresponding feed mechanism, and using packaging material in strips of appropriate width, the machine can be used for packaging a plurality of strings or rows of tablets simultaneously. In such a machine, the packaged tablets may be cut apart in rows extending transversely of the machine or, if desired, the cutting roll 125 may be provided with suitable known means for cutting apart the packages of each transverse row, so that the tablets are delivered from the machine in individual packages. The manner in which our machine may be constructed for packaging a plurality of strings or rows of tablets will be obvious and need not be illustrated nor further described here. Our invention comprehends a machine suitable for packaging either a single string or a plurality of strings of tablets, as above described.

As has been above indicated, and as will be understood by those skilled in the art, changes in construction and arrangement of parts of the machine embodying our invention may be resorted to without departing from the field and scope thereof, and we intend to include all such variations, as fall within the scope of the appended claims, in this application in which the preferred forms only of our invention have been disclosed.

We claim:

1. In a packaging machine, a feed trough, means for vibrating said trough for feeding therealong substantially continuously and at a predetermined rate articles to be packaged toward the discharge end of said trough, and feed means comprising members moving across the discharge end of said trough having recesses adapted for reception of the individual articles and travelling in a rectilineal path leading away from the discharge end of said trough and at approximately the same rate as the travel of said articles along said trough.

2. In a machine for packaging substantially disc shaped flat sided tablets, a substantially horizontal vibrating trough adapted to receive a column of tablets disposed therein on edge with their flat sides in contact and to advance said column substantially continuously at a uniform rate to the discharge end of said trough, and means passing downward across the discharge end of said trough whereby the tablets are removed from the advancing end of the column and moved in the direction of travel thereof at a rate equal to the rate of travel of the column.

3. In a packaging machine, a substantially horizontal trough, means for vibrating said trough endwise effective for causing travel therealong of articles to be packaged at a substantially continuous predetermined rate toward the discharge end of the trough, and feed means adjacent the discharge end of said trough comprising members moving downward across said discharge end and away from the latter at approximately the same rate as the rate of travel of said articles along said trough, said members having recesses for reception of individual articles discharged from said trough.

4. In a packaging machine, a substantially horizontal trough, means for vibrating said trough endwise effective for causing travel therealong of articles to be packaged at a substantially continuous predetermined rate toward the discharge end of the trough, an endless conveyor adjacent the discharge end of said trough, and article receiving members carried by said conveyor movable therewith along a rectilineal path downward across the discharge end of said trough and away from the latter at approximately the same rate as the rate of travel of the articles along said trough, said members having recesses therein for reception of individual articles to be packaged.

5. In a packaging machine, a substantially horizontal trough, means for vibrating said trough endwise effective for causing travel therealong of articles to be packaged at a substantially continuous predetermined rate toward the discharge end of the trough, a member extending downward and away from said trough at the discharge end thereof and yieldingly urged away from said discharge end, and feed means comprising buckets moving downward across the discharge end of said trough and away from the latter at approximately the same rate as the travel of said articles along said trough, each of said buckets having therein a recess open at its lower end in the downward travel of the bucket and of a size to receive one of the articles to be packaged, said member holding the articles resiliently pressed in the recesses of the buckets during travel of the latter downward along said member.

FREDERICK A. LOBLEY.
WILLIAM T. WILLIAMS.
WALTER E. LOWELL.

REFERENCES CITED

The following references are of record in the file of this patent:

UNITED STATES PATENTS

| Number | Name | Date |
| --- | --- | --- |
| 1,920,563 | Jahne | Aug. 1, 1933 |
| 2,332,600 | Rapp | Oct. 26, 1943 |
| 1,485,141 | MacDonald | Feb. 26, 1924 |
| 2,083,618 | Salfisberg | June 15, 1937 |
| 2,086,735 | Neumiller | July 13, 1937 |
| 2,139,041 | Salfisberg | Dec. 6, 1938 |
| 2,180,966 | Salfisberg | Nov. 21, 1939 |
| 708,255 | Prouty et al. | Sept. 2, 1902 |
| 1,920,563 | Johne | Aug. 1, 1933 |
| 2,198,036 | Isted | Apr. 23, 1940 |
| 2,180,163 | Milmoe et al. | Nov. 9, 1944 |
| 2,348,400 | Manspeaker | May 9, 1944 |
| 622,841 | Crowell | Apr. 11, 1899 |
| 1,320,699 | Leumann | Nov. 4, 1919 |
| 2,334,029 | Ranney et al. | Nov. 9, 1943 |

FOREIGN PATENTS

| Number | Country | Date |
| --- | --- | --- |
| 362,354 | Germany | Oct. 27, 1922 |